United States Patent [19]
Alcorn

[11] Patent Number: 6,073,546
[45] Date of Patent: Jun. 13, 2000

[54] FOOD GRILL AND COOKING BASKET

[76] Inventor: Gary S. Alcorn, 165 Alcorn Loop Rd., Ruffin, N.C. 27326

[21] Appl. No.: 09/304,456

[22] Filed: May 3, 1999

Related U.S. Application Data

[62] Division of application No. 08/989,730, Dec. 12, 1997, Pat. No. 5,906,152.

[51] Int. Cl.[7] ..................................................... A47J 37/08
[52] U.S. Cl. .................................. 99/427; 99/449; 99/450
[58] Field of Search .............................. 99/427, 426, 450, 99/449

[56] References Cited

U.S. PATENT DOCUMENTS

| | | | |
|---|---|---|---|
| 706,502 | 8/1902 | Van Wie | 99/450 X |
| 3,091,170 | 5/1963 | Wilson | 99/427 |
| 3,559,565 | 2/1971 | Getz | 99/450 X |
| 5,325,767 | 7/1994 | Beller | 99/421 |
| 5,660,101 | 8/1997 | Cirigliano | 99/395 |
| 5,755,153 | 5/1998 | Su | 99/426 X |
| 5,761,991 | 6/1998 | Kambies | 99/427 |

*Primary Examiner*—Reginald L. Alexander

[57] ABSTRACT

A cooking grill is provided with a tubular compartment positioned within a fuel container. The tubular compartment has a removable tray upon which food items may be placed. Heat is evenly distributed within the tubular compartment by burning charcoal to provide an even, uniform cooking temperature throughout. Additionally a grill cooking basket is provided which is well suited to positioning over the grill's fuel container. The grill basket includes a transverse member which rides upon a ledge within the fuel container of the grill. When rotated, the transverse member forces the grill basket upwardly away from the burning fuel in order to prevent the grill basket from inadvertently contacting the burning fuel. V-shaped forks hold each grill basket in place on the fuel container at the front and rear.

8 Claims, 5 Drawing Sheets

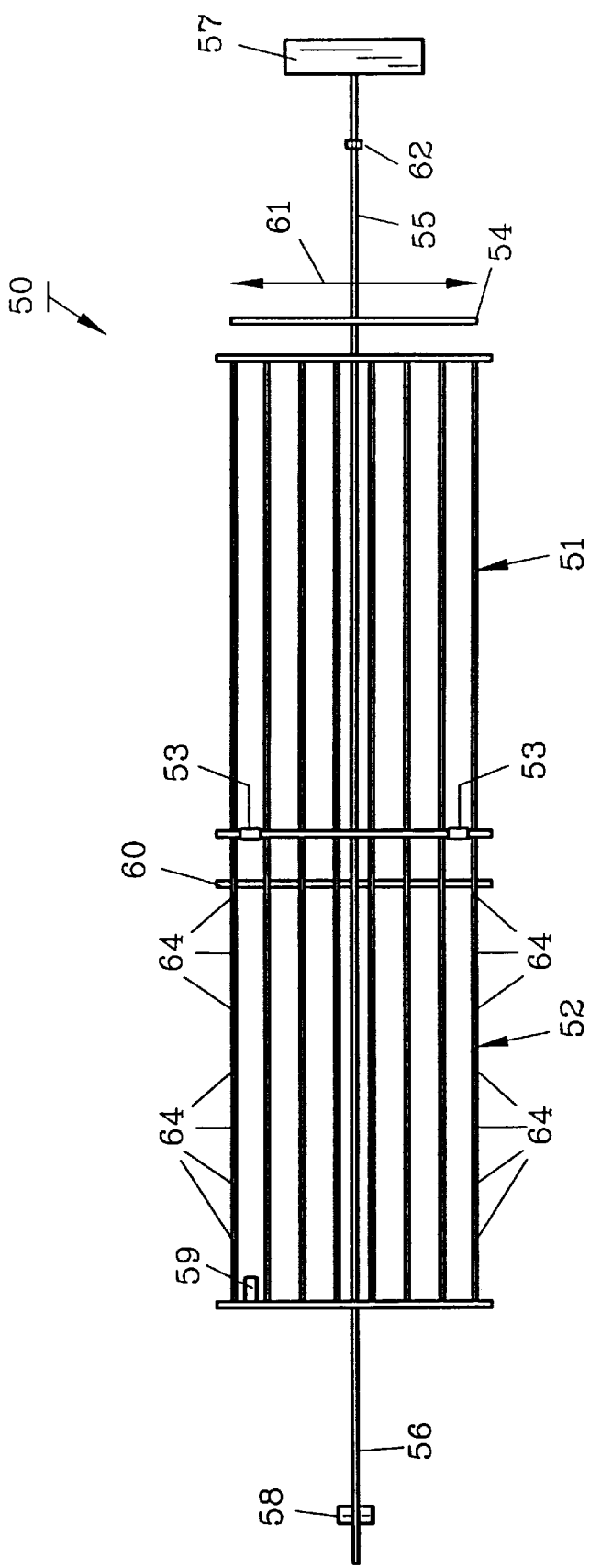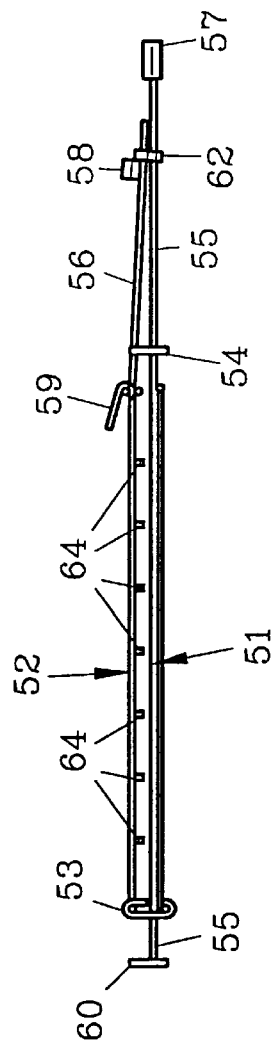
FIG. 4
FIG. 5

FOOD GRILL AND COOKING BASKET

This is a division of application Ser. No. 08/989,730 filed Dec. 12 1997, now U.S. Pat. No. 5,906,152.

BACKGROUND OF THE INVENTION

1. Field of the Invention

This invention pertains to grills, specifically outdoor food grills and cooking baskets which may be used therewith.

2. Description of the Prior Art And Objectives of the Invention

Outdoor grilling is amongst the nation's most favorite pastimes. Recognizing this, numerous grills have proliferated on the market to satisfy the urges of the increasing numbers of outdoor chefs. Some have been adapted for gas use and may even be used indoors. Other grills have been produced which are round, square, spherical, and almost any shape imaginable. People cook everything from hot dogs, hamburgers, and steaks to potatoes and mushrooms on their grills.

While functional and convenient, conventional grills create problems flipping items placed on the grill's wire mesh or other cooking surface. For example, hamburgers may crumble or stick to the wire mesh and cause difficulty as a user attempts to insert a spatula between the hamburger and the wire mesh during cooking. A potato wrapped in aluminum foil may be irregularly shaped and thus difficult to turn with a spatula or tongs as the irregularities cause the potato to "tip over" from its desired positioning. Another problem arises when the wire mesh is so crowded that it is difficult to position the spatula under a selected item, resulting in time wasted repositioning items while the selected item burns.

Additionally, repeated use of standard grills often causes the bottom to "burn out" as charcoal ash and fat can mix to form a caustic solution which rusts and corrodes the bottom of the grill.

Thus, with the above problems and limitations in mind, it is an objective of the present invention to provide a wire mesh cooking basket which readily and securely receives items to be cooked and also facilitates rotation of said items while cooking.

It is a further objective of the present invention to provide a grill which includes a tubular compartment which is proximate the cooking coals, below the basket, and which evenly distributes heat within for an additional cooking area.

It is yet a further objective of the present invention to provide a grill which is well suited for use in combination with the above mentioned cooking basket.

It is still a further objective of the present invention to provide a grill which is easily adapted for use with gas, charcoal, wood or other fuels.

It is another objective to provide a set of easily replaceable metal pans which line the grill bottom to prevent rusting.

It is yet another objective to provide a grill which holds a cooking basket.

It is still another objective to provide a grill which may be closed to smother a fire or reduce smoke.

These and other objectives and advantages will become readily apparent to those skilled in the art upon reference to the following detailed description and appended claims.

SUMMARY OF THE INVENTION

The aforesaid and other objectives are realized by a grill suited for use in conjunction with a cooking basket. The cooking basket is formed from two opposing planar open mesh wire structures which are hingedly joined at one end. Each wire structure includes a longitudinal member, one of which is attached to a pair of transverse members. A catch allows the two longitudinal members to be releasably joined so that the cooking basket may be held in a closed posture. A pair of wooden handles attached to the longitudinal members allow the cooking basket to be manually manipulated without burning the user and allow the user to not have to touch a grease fouled surface. For sanitary and durability concerns, the cooking basket, with the exception of the handle, is made of metal, preferably stainless steel. The grill is preferably adapted for use with two such cooking baskets.

The longitudinal members of each of the cooking baskets are received by two opposing v-shaped vertical forks attached to a frame positioned proximate the fuel container of the grill. These forks act as guides to locate and hold the cooking basket in place during cooking manipulations. The transverse members of the baskets are preferably elongated, solid members which ride on the frame and force the basket upwardly, away from the coals as the user turns the food laden basket. While preferred, these elongated transverse members could be replaced by elliptical or round members of sufficient diameter to cause the basket to clear the coals when turned.

Additionally, the grill is provided with a cylindrical tubular cooking compartment which extends through the fuel container of the grill. This tubular cooking compartment includes a door with a handle and an open wire mesh tray. The tray is slightly arcuate and supported by a shelf within the tube. This compartment receives heat from burning fuel and the circular cross-section effectuates an even distribution of heat. Thus, this compartment is well suited for cooking potatoes, hot dogs or other items.

A pair of trays line the fuel container and preferably hold charcoal or fuel for cooking, although "lava rocks" or other heat distributors could be so held. These trays slip somewhat under the tubular cooking compartment and allow the burning fuel or other means for heating the food to effectively surround the cooking compartment while at the same time catching grease dripping from food that is cooking. These trays are easily removable and replaceable in the event of corrosion or rusting. This protects the fuel container from deteriorating.

BRIEF DESCRIPTION OF THE DRAWINGS

FIG. 4 features a top view of the preferred cooking basket of the present invention seen in its open position;

FIG. 5 depicts a side view of the cooking basket of FIG. 4 in a closed position.

DETAILED DESCRIPTION OF THE PREFERRED EMBODIMENT AND OPERATION OF THE INVENTION

Figure 1:
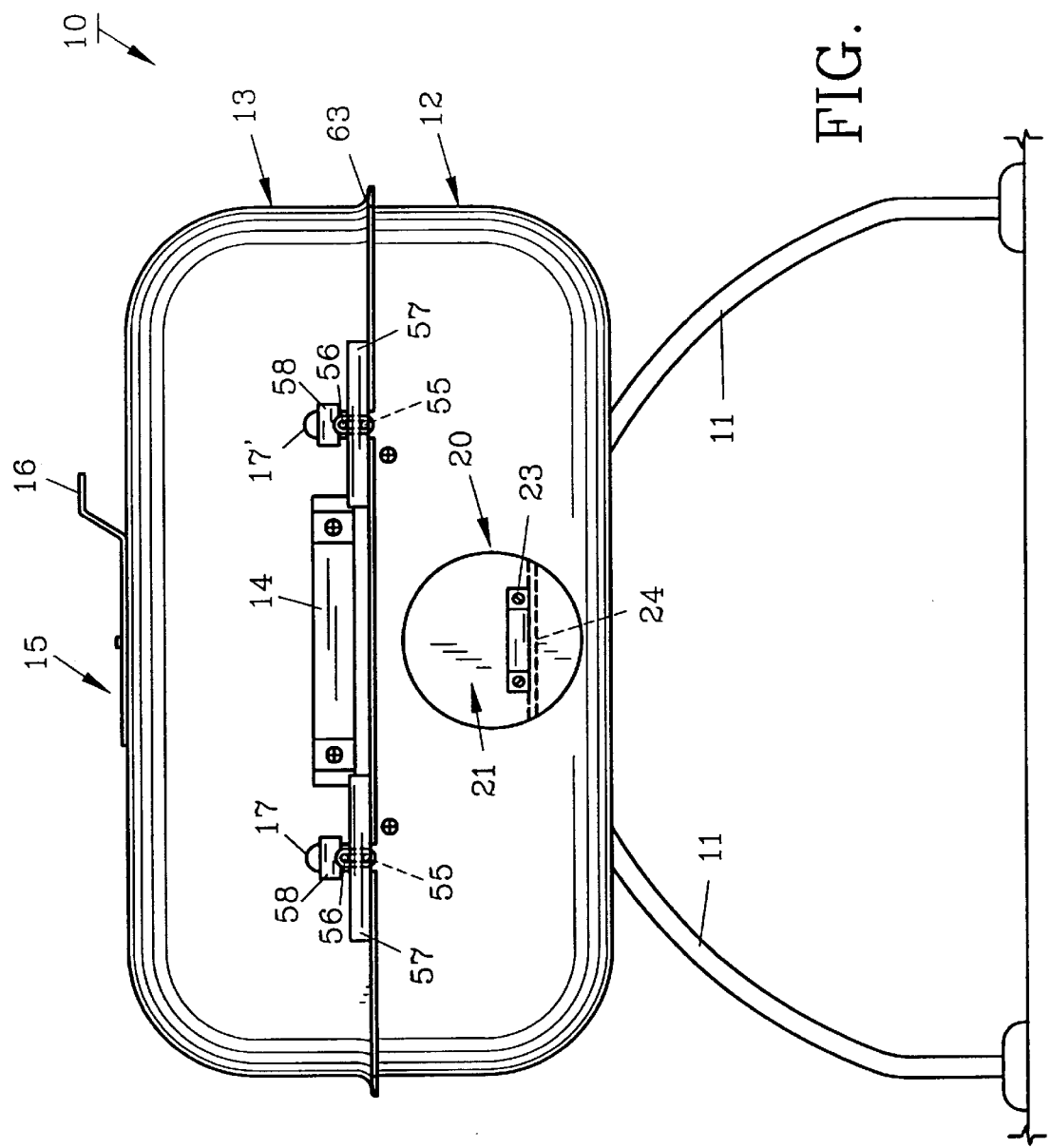
FIG. 1 shows a front view of the preferred grill of the present invention in a closed position.

Turning now to the drawings, specifically FIG. 1 shows a front view of preferred outdoor food grill 10. Grill 10 includes conventional legs 11 (only the front two shown, but three or four are used in practice) which may optionally have wheels (not shown) on the terminal ends as is conventional for ease in moving grill 10. Container 12 rests atop legs 11 and is designed to receive a means to heat food such as charcoal, wood, natural gas or other fuel. Top 13 is hingedly joined to fuel container 12 as is conventional. Top handle 14 is preferably wood and is attached to top 13. Vent 15 is positioned in the center of top 13 and includes cover 16 which rotates to open and close vent 15 as is standard. Grill 10 is predominately, preferably metal, except as noted, to maintain structural integrity in the face of heat such as experienced during food grilling. Also seen is tubular compartment 20 covered by door 21 which is rigidly affixed to handle 23.

Extending into notches 17 and 17' are longitudinal members 55 and 56 of cooking baskets 50 (FIGS. 4 and 5). Note that notches 17 and 17' are exaggerated in size for clarity. Longitudinal members 55 and 56 are attached to wooden handles 57 and 58 respectively.

Figure 2:
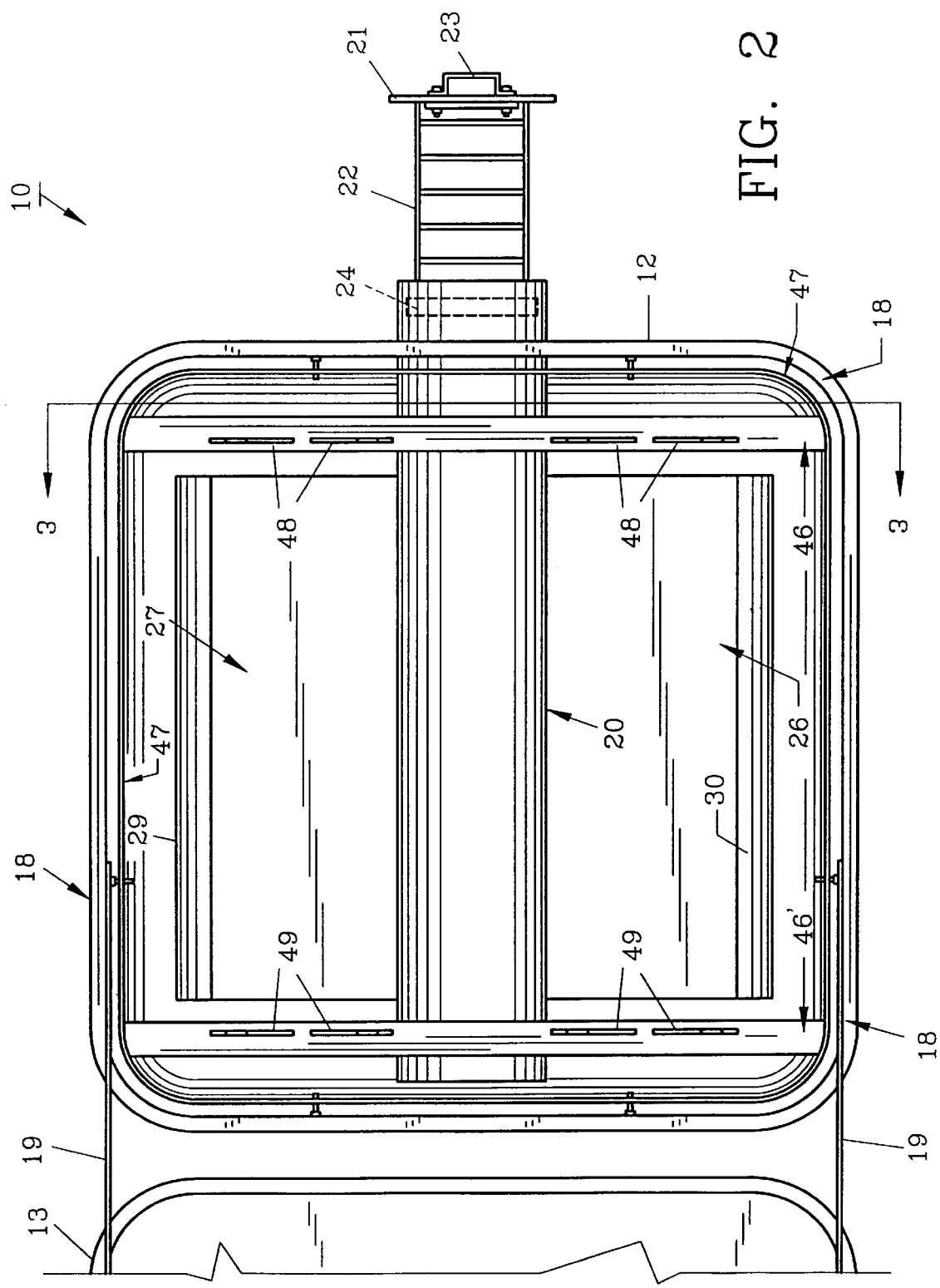
FIG. 2 illustrates a partial top view of the preferred grill of FIG. 1 in an open position, with the cooking baskets removed and the interior tray partially extended from its tubular compartment.
Figure 3:
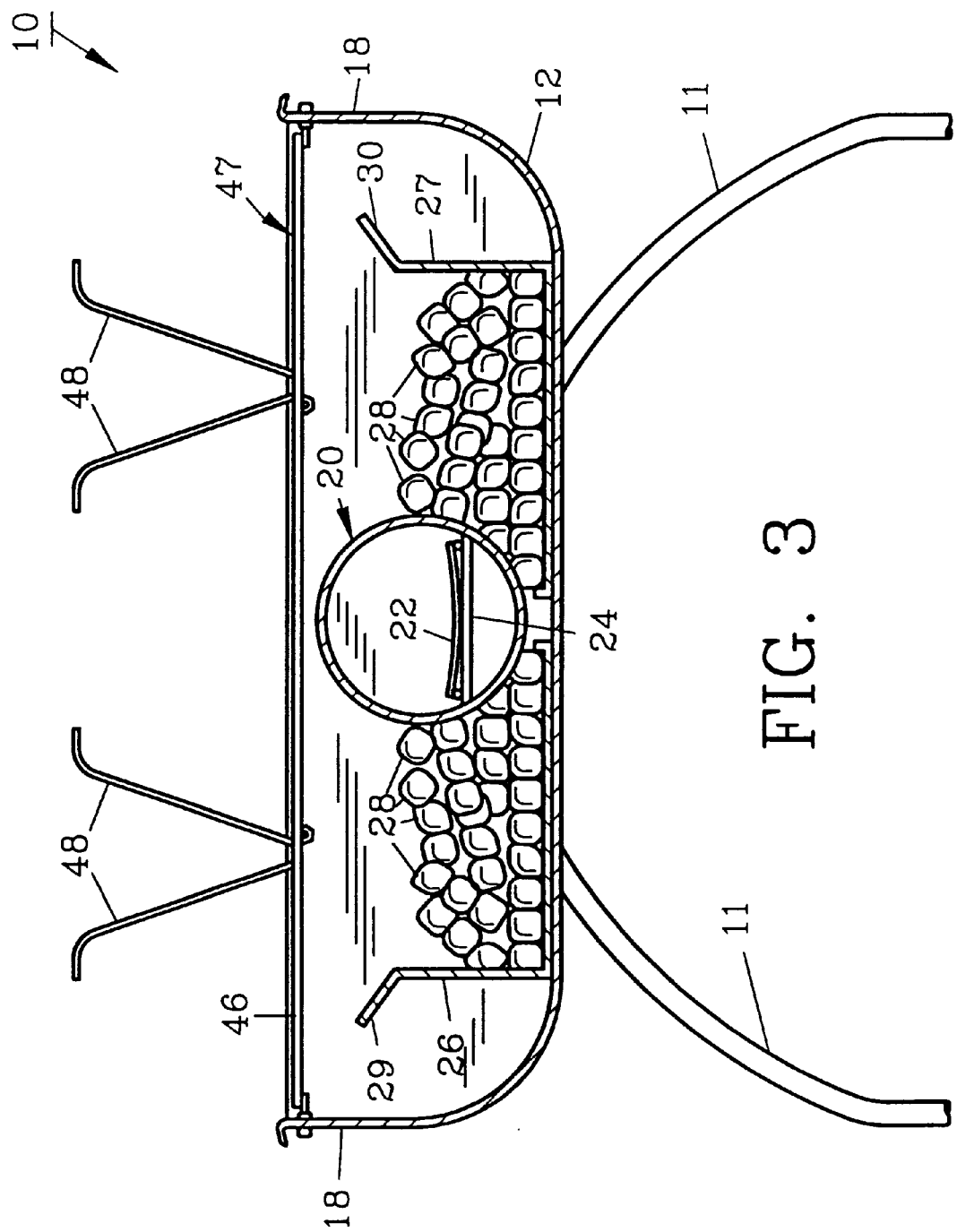
FIG. 3 demonstrates a cross sectional view of the preferred grill along lines 3—3 of FIG. 2.
Figure 6A:
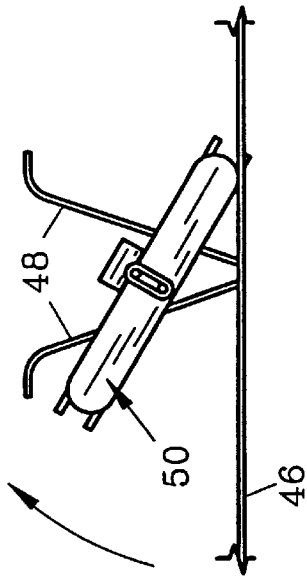
FIGS. 6 A–6 D picture the preferred cooking basket of FIG. 4 with one handle removed for clarity, in various rotated positions.
Figure 6B:
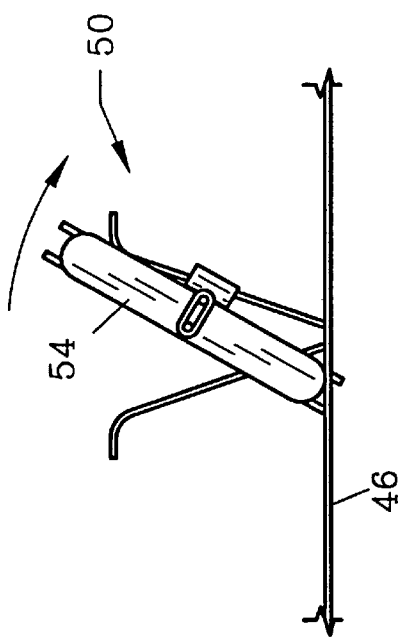
Figure 6C:
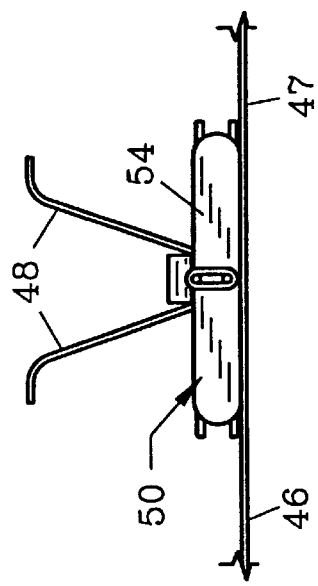
Figure 6D:
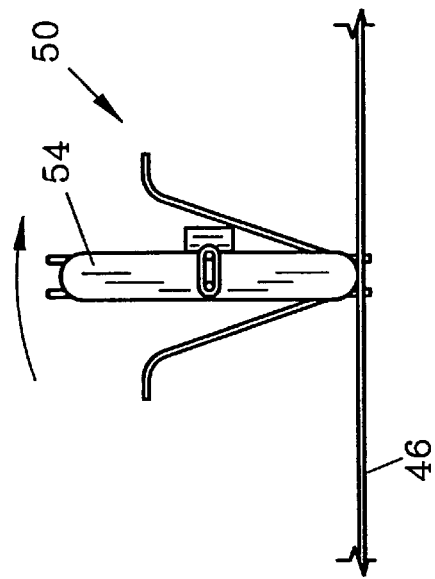

In FIGS. 2 and 3, the interior of grill 10 shows frame 47 which is generally rectangular and is positioned within container 12 near sidewalls 18. Frame 47 includes front cross bar 46, rear cross bar 46', front v-shaped vertical forks 48 and back v-shaped vertical forks 49 for support of front and back transverse members 54 and 60 respectively of cooking basket 50 (FIGS. 4 and 5). Frame 47 is atop tubular compartment 20 and is supported by brackets or screws, while left pan 26 and right pan 27 extend under and to the sides of tubular compartment 20. Pans 26 and 27 are preferably tin and generally somewhat cup-like while being sized to fit within container 12. Pans 26 and 27 are considered receptacles and are designed to contain a means to heat and cook on grill 10 such as usual charcoal briquettes 28. While charcoal is preferred, other heating means are acceptable. These alternative means for heating include, but are not limited to, heat dispersing rocks such as are commonly used in gas grills, wood or even coal. In use, the fuel or means for heating are placed in pans 26 and 27 such that some portion of the heating means is directly under tubular compartment 20 while also being stacked against the sides of tubular compartment 20 as seen in FIG. 3. Pans 26 and 27 include raised edges 29 and 30 respectively which effectively provide handles for inserting and removing pans 26 and 27 for cleaning or replacement as needed. While a cylindrical tubular compartment 20 is preferred, other shapes are possible, including squares, rectangles and ellipses. Circular cross-sections are preferred because it causes heat to be evenly radiated within tubular compartment 20. Also seen in FIGS. 2 and 3, tines of forks 48 are curved at the top to avoid sharp upwardly facing surfaces which may cause injury. Note that tines of rear forks 49 can also be curved outwardly as well for similar reasons, although, the rearward positioning of forks 49 does not necessitate this precaution.

Tray 22 attached to door 21 as further shown in FIGS. 2 and 3. Tray 22 is slightly arcuate and supported by shelf 24 (seen dotted in FIGS. 1 and 2) within tubular compartment 20. Tray 22 is well suited to support and cook items such as potatoes and hot dogs. Mushrooms wrapped in aluminum foil are also easily accommodated as are similar items. Hinges 19 (FIG. 2) allow top 13 to pivot open and closed as is well understood by those familiar with grills.

FIGS. 4 and 5 illustrates preferred cooking basket 50 in its open position (FIG. 4) and its closed position (FIG. 5). Cooking basket 50 includes first open wire mesh structure 51 and second open wire mesh structure 52 which are joined by hinges 53. Each hinge 53 is essentially an exaggerated c-shaped member attached to mesh structure 51 which receives an axle formed by one of the transverse wires of structure 52. This allows the space between structure 51 and 52 to collapse or expand as needed by the thickness of the article placed within basket 50 such as a hamburger patty. Studs 64 are affixed to structure 52 in order to provide lateral support for food items in basket 50 during turning as thin food items may fall from of basket 50, but for studs 64. Studs 64 are preferably made of the same wire that mesh structure 51 and 52 are made and extend essentially the height of hinge 53 so as to generally span the space between structures 51 and 52 when basket 50 is closed. Catch 62 surrounds first longitudinal member 55 and slips over the terminal end of second longitudinal member 56 when basket 50 is closed. Catch 62 is preferably a loop, sized so as to fit over both longitudinal members, but other catches are contemplated such as a hook or an s-shaped member. Latch 59 on first structure 51 is designed to engage lip 63 (FIG. 1) on top 13 so as to hold basket 50 open as desired, when grill 10 is open.

In use, empty cooking basket 50 may be placed on grill 10 and opened. Food items may then be placed in basket 50 with latch 59 engaged with top 13 without having to manually hold basket 50 open. It should be noted in FIG. 4 that first longitudinal member 55 is attached to first transverse member 54 and second transverse member 60, and that transverse members 54 and 60 are substantially as wide as structures 51 and 52 indicated generally by arrow 61. Transverse members 54 and 60 are each preferably elongated members whose length is substantially greater than its width, but other shapes such as circles, ellipses or the like are contemplated. The elongated transverse shape allows basket 50, in its normal cooking position, to sit very close to the heating means, while at the same time raising basket 50 above the heating means when basket 50 is rotated. A circular transverse member (not shown) would maintain basket 50 above the heating means a constant amount, and would effectively space basket 50 from the heating means. While acceptable, this circular transverse member and resulting positioning is not preferred.

FIGS. 6 A–D demonstrate the rotation of basket 50 when positioned in grill 10 on frame 47. Note that handle 57 is removed for clarity. In FIG. 6A, longitudinal members 55 and 56 are positioned in front fork 48, with transverse member 54 positioned on front cross bar 46 of frame 47. While not seen, longitudinal member 55 is also positioned in back fork 49 and second transverse member 60 also rests on frame 47 on rear cross bar 46'. When cooking basket 50 is turned either clockwise or counter-clockwise, elongated transverse members 54 and 60 cause longitudinal member 55 to rise upwardly within forks 48 and 49, thereby lifting basket 50 above the heating means (FIG. 6B). When basket 50 is vertical as seen in FIG. 6C, the trailing edge of structures 51 and 52 clear the heating means, thus allowing basket 50 to freely rotate above the heating means. As seen in FIG. 6D, transverse members 54 and 60 allow basket 50 to be lowered proximate the heating means again. As noted above, the elongated shape of transverse members 54 and 60 is preferred to allow basket 50 to be very close to the heating means during normal cooking, while effectively raising basket 50 when manually turning. Other shapes such as a circular transverse member (not shown) would hold basket 50 substantially above the heating means during cooking while also allowing basket 50 to turn.

The preceding recitation is provided as an example of the preferred embodiment and is not meant to limit the nature or scope of the present invention and appended claims.

What is claimed is:

1. A food grill comprising:
   a) a container;
   b) at least one v-shaped fork, said v-shaped fork positioned on said container; and
   c) a first cooking basket, said first cooking basket positioned above said container, said first cooking basket comprising a transverse member and a longitudinal member, said transverse member resting on said container, said longitudinal member resting in said v-shaped fork; whereby rotation of said longitudinal member rotates said transverse member thereby to force said cooking basket upwardly as it rotates.

2. The food grill of claim 1 further comprising a second cooking basket.

3. The food grill of claim 1 further comprising means to heat said cooking basket, said heating means within said container proximate said cooking basket.

4. The food grill of claim 3 further comprising a receptacle, said receptacle adapted to receive heating means and positioned proximate said container.

5. The food grill of claim 1 wherein said first cooking basket comprises a pair of hingedly joined open mesh wire structures.

6. The food grill of claim 1 wherein said container is metal.

7. The food grill of claim 1 wherein said container is generally rectangular.

8. The food grill of claim 1 further comprising a tubular compartment, said tubular compartment proximate said container.

\* \* \* \* \*